United States Patent
Kambhampati et al.

(10) Patent No.: US 11,775,506 B2
(45) Date of Patent: Oct. 3, 2023

(54) QUALITY CONTROL TEST TRANSACTIONS FOR SHARED DATABASES OF A COLLABORATION TOOL

(71) Applicants: Atlassian Pty Ltd., Sydney (AU); Atlassian Inc., San Francisco, CA (US)

(72) Inventors: Ravi Kambhampati, Austin, TX (US); Malcolm Angus, San Francisco, CA (US); Georg Kasper, San Francisco, CA (US); Yash Sharma, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 87 days.

(21) Appl. No.: 17/104,797

(22) Filed: Nov. 25, 2020

(65) Prior Publication Data
US 2021/0200748 A1 Jul. 1, 2021

Related U.S. Application Data

(63) Continuation of application No. 16/861,123, filed on Apr. 28, 2020, now Pat. No. 10,909,109.

(60) Provisional application No. 62/954,937, filed on Dec. 30, 2019.

(51) Int. Cl.
G06F 16/00 (2019.01)
G06F 16/23 (2019.01)
G06F 16/22 (2019.01)
G06F 9/46 (2006.01)

(52) U.S. Cl.
CPC .......... *G06F 16/2379* (2019.01); *G06F 9/466* (2013.01); *G06F 16/2282* (2019.01); *G06F 16/2365* (2019.01)

(58) Field of Classification Search
CPC .. G06F 16/2379; G06F 9/466; G06F 16/2282; G06F 16/2365
See application file for complete search history.

(56) References Cited

U.S. PATENT DOCUMENTS

| 8,850,391 B1 | 9/2014 | Lin et al. |
| 2002/0054155 A1 | 5/2002 | Churchill |
| 2002/0101920 A1 | 8/2002 | Choi |

(Continued)

OTHER PUBLICATIONS

Mathur, Ankit, "Testing your databases with Db Unit," https://web.archive.org/web/20180101093124/http://opensourceforu.com:80/2011/05/testing-your-databases-with-dbunit/, 2011.

(Continued)

*Primary Examiner* — Syed H Hasan
(74) *Attorney, Agent, or Firm* — Brownstein Hyatt Farber Schreck, LLP

(57) ABSTRACT

A collaboration tool includes a collaborative database consistency system that includes a host service to receive user input and, in particular, a selection of data to monitor. The host service is coupled to an upstream dependency traverser service configured to generate a dependency tree identifying all tables upon which the selected data to monitor depends, at least in part. A unit test service receives the dependency tree as input and automatically generates suitable pass/fail tests for each table identified in the dependency tree. Thereafter, the unit test service can execute each generated pass/fail test to determine whether the data to monitor is valid.

20 Claims, 9 Drawing Sheets

(56) References Cited

U.S. PATENT DOCUMENTS

| | | | |
|---|---|---|---|
| 2003/0191774 A1* | 10/2003 | Slutz | G06F 16/242 |
| | | | 707/999.102 |
| 2005/0004918 A1 | 1/2005 | Platt | |
| 2005/0127173 A1* | 6/2005 | Idol | G06Q 20/20 |
| | | | 235/383 |
| 2005/0210049 A1 | 9/2005 | Foster | |
| 2005/0223043 A1* | 10/2005 | Randal | G06F 16/221 |
| 2006/0149768 A1 | 7/2006 | McCormack et al. | |
| 2006/0265172 A1 | 11/2006 | Basham et al. | |
| 2007/0180441 A1 | 8/2007 | Ding et al. | |
| 2009/0013259 A1* | 1/2009 | Teichman | G06N 5/04 |
| | | | 715/738 |
| 2009/0070734 A1* | 3/2009 | Dixon | G06F 11/3616 |
| | | | 717/122 |
| 2015/0113330 A1 | 4/2015 | Grondin | |
| 2015/0135158 A1* | 5/2015 | Tenev | G06F 11/3684 |
| | | | 717/101 |
| 2015/0254295 A1* | 9/2015 | Harding | G06F 11/3688 |
| | | | 707/690 |
| 2017/0242784 A1 | 8/2017 | Heorhiadi et al. | |
| 2018/0129592 A1* | 5/2018 | Li | G06F 11/3684 |
| 2018/0336258 A1* | 11/2018 | Lee | G06F 11/36 |
| 2019/0065349 A1 | 2/2019 | Sharma et al. | |
| 2020/0089792 A1* | 3/2020 | Packirisamy | G06F 16/24565 |

OTHER PUBLICATIONS

Google Search Results, Google.com, 2020.

\* cited by examiner

QUALITY CONTROL TEST TRANSACTIONS FOR SHARED DATABASES OF A COLLABORATION TOOL

CROSS-REFERENCE TO RELATED APPLICATION(S)

This application is a continuation patent application of U.S. patent application Ser. No. 16/861,123, filed Apr. 28, 2020 and titled "Quality Control Test Transactions for Shared Databases of a Collaboration Tool," which is a nonprovisional patent application of and claims the benefit of U.S. Provisional Patent Application No. 62/954,937, filed Dec. 30, 2019 and titled "Quality Control Test Transactions for Shared Databases of a Collaboration Tool," the disclosures of which are hereby incorporated herein by reference in their entireties.

TECHNICAL FIELD

Embodiments described herein relate to collaboration tools and, in particular, to systems and methods for actively monitoring, and maintaining consistency of, shared databases of a collaboration tool.

BACKGROUND

An organization can leverage a collaboration tool that is accessible by many individuals to facilitate completion of work related to a common goal. In many cases, different portions of a collaboration tool (e.g., different projects, pages, tools, and the like) may be configured to access a shared database. However, in many cases, a portion of a collaboration tool configured to access a shared table of a shared database may not own or control data quality of that shared table and, therefore, may be unable to notice, identify, or remedy data quality issues originating from, or propagated by, the shared table.

SUMMARY

Certain embodiments described herein relate to methods for operating a collaborative database consistency system configured to monitor data consistency, freshness, and/or accuracy of one or more tables of one or more databases of a collaboration tool. In particular, embodiments described herein include an upstream dependency traverser service configured to identify all table, column, or database dependencies invoked when a query or, more generally, a transaction is executed against a selected database, or set of databases associated with the collaboration tool.

More specifically, an upstream dependency traverser service such as described herein can generate a dependency tree identifying all tables upon which a particular query, or set of queries (a "transaction"), directly or indirectly depends. Thereafter, a unit test service can consume, or otherwise receive, the dependency tree as input and can construct and execute one or more test queries or transactions that, in turn, generate testable metrics, referred to herein as "metadata characteristics," associated with, or otherwise indicative of, data quality, data freshness, data staleness, data reliability, data variance, data accuracy, data precision, or other metrics informative of a quality of data stored in a database.

Once a metadata characteristic (e.g., latency of a given table) is determined, that characteristic can be compared against a specification (e.g., a numerical range, a datatype, a non-null status, and so on) for that metadata characteristic. If the metadata characteristic satisfies the specification, the system determines that the query or transaction under test passes unit testing. Alternatively, if the metadata characteristic does not satisfy the specification, the system determines that the query or transaction under test fails unit testing. In many examples, a notification that unit testing has failed or has passed can be delivered to an owner of the table, query, or transaction under test and, additionally or alternatively, can be delivered to an owner of any table or database exhibiting a metadata characteristic that fails to satisfy the specification.

In many embodiments, a system such as described herein is configured to automatically generate one or more test transactions, such as the example test transaction described above, for each table, database, and/or column identified in the dependency tree output from the upstream dependency traverser service. In these examples, hundreds or thousands of tests can be automatically created, stored in a database, and scheduled for regular execution. As a result of these constructions, data quality of a shared database can be maintained without requiring manual scheduling, execution, creation, and maintenance of table-specific or column-specific data quality tests and, in turn, without requiring specialized database and/or relation schema knowledge, expertise, experience, or access permissions.

In particular, some embodiments described herein relate to, include, or take the form of a system for automatic generation and execution of test transactions to monitor data retrieved from a database served by a database service. The system includes a memory allocation (which can include one or more physical memory modules access to which may be controlled or otherwise gated by a hypervisor or kernel-based virtual machine) configured to store executable instructions. The system further includes a processor allocation (which can include one or more physical processing elements access to which may be controlled or otherwise gated by a hypervisor or kernel-based virtual machine or the like) configured to access the memory allocation and execute the executable instructions to instantiate one or more of a variety of purpose-configured virtual machines, containers, lambda functions, or other server or serverless functions or functional modules.

For example, in many embodiments, the processor allocation is configured to instantiate a host service. The host service is configured to receive an input including a selection by a user of the system of data to monitor. The data to monitor can be data stored in a table of the database or, in other cases, can be data obtained as a result of a successful execution of one or more queries or transactions against the database. In many embodiments, although not required, the data is at least in part an aggregation of two or more columns of two or more tables of the database.

The processor allocation of the system is, in many embodiments, further configured to instantiate an upstream dependency traverser service. The upstream dependency traverser service is configured to define a dependency tree identifying all tables of the database that the data to monitor either directly or indirectly depends upon. In many embodiments, the upstream dependency traverser service is configured to recursively access one or more table/relation schemas and/or one or more database schemas to determine, for each respective table, what input(s) inform, or otherwise contribute to, at least one column of that respective table. In many examples, the upstream dependency traverser service operates recursively or iteratively.

The processor allocation of the system is, in many embodiments, further configured to instantiate a unit test service configured to receive the dependency tree from the upstream dependency traverser service and, therewith, generate at least one test transaction of at least one table of the database identified by the dependency. In response to receiving a result of an execution of the test transaction, the system thereafter notifies the user that the data to monitor has passed or failed unit testing.

Some embodiments include a configuration in which the upstream dependency traverser service is configured to receive, from the host service, a transaction to retrieve the selected data from a database hosted by the database service. In addition, the system can be configured to determine a set of tables referenced by the transaction, and define the dependency tree characterizing the received transaction by identifying, for each respective table of the set of tables, all tables of the database that includes at least one upstream column upon which at least one field of that respective table directly or indirectly depends.

Some embodiments include a configuration in which the unit test service is configured to receive the dependency tree from the upstream dependency traverser service, and for each respective table identified by the dependency tree generate a test transaction by populating a template test transaction with data extracted from a relation schema defining the respective table and, thereafter, execute the populated template test transaction according to a schedule defined by the input provided to the host service by the user.

Some embodiments include a configuration in which the unit test service merges the populated template test transaction into a test transaction database.

Additional embodiments described herein relate to, include, or take the form of a system for automated evaluation of data quality and reliability of a selected table of a database served by a database service by automatic generation and execution of test transactions. In particular, in these examples, the system includes an upstream dependency traverser server and a unit test server. The upstream dependency traverser server can be configured to define a dependency tree identifying all tables of the database upon which any column of the selected table depends. The unit test server, correspondingly, can be configured to generate a respective test transaction to obtain a respective metadata characteristic (e.g., a latency, a variance, a z-score, an average, a maximum, or a minimum, and so on) describing each respective table identified in the dependency tree.

In addition, the unit test server can be configured to repeatedly execute each respective test transaction, according to a selected schedule, and generate a notification indicating (1) the selected table failed unit testing in response to determining that at least one obtained metadata characteristic value does not satisfy a specification (e.g., falls within a range, equals a value, is true or false, and so on), or (2) passed unit testing in response to determining that each obtained metadata characteristic value satisfies the specification.

In these examples, some embodiments include a configuration in which the specification may be received from a user of the system and may be provided as input to the unit test service. The specification can be provided in any suitable computer-readable format.

Some further embodiments include a configuration in which the specification includes one of a numerical value, a range of numerical values, a date value, a date range, a monetary value, or a string value.

In some embodiments, the system can be configured to, in response to the unit test service determining that the at least one obtained metadata characteristic value does not satisfy the specification, display a notification to a user (e.g., an administrator or owner of the at least one table identified by the notification or, additionally or alternatively, an administrator or owner of the selected table) via a graphical user interface rendered by a client device in communication with the database service. In some cases, the notification identifies a table associated with the at least one obtained metadata characteristic value that does not satisfy the specification.

Still further embodiments described relate to, include, or take the form of a system for automated evaluation of data quality and reliability of a selected table of a database served by a database service of a collaboration tool. Such a system can include a host server configured to present a graphical user interface to a user, the graphical user interface including at least a table selection interface element, a test type selection element, and an interval selection element. In this example, the host server can be configured to receive from the user a selected table, a selected test type, and a selected interval.

Thereafter, the host server can communicate with an upstream dependency traverser server configured to define a dependency tree identifying all tables of the database upon which any column of the user-selected table depends. Therewith, as with other embodiments described herein, a unit test server can be leveraged to receive (1) the dependency tree from the upstream dependency traverser service, (2) the selected table, (3) the selected test type, and (4) the selected schedule.

With this information, the unit test server can repeatedly, at the user-selected interval determine (1) based on the user-selected test type, a metadata characteristic of at least one table identified by the dependency tree and (2) generate a notification to the user that the selected table passes unit testing in response to determining that the metadata characteristic satisfies a specification associated with the user-selected test type or, alternatively, that the selected table fails unit testing in response to determining that the metadata characteristic does not satisfy the specification.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
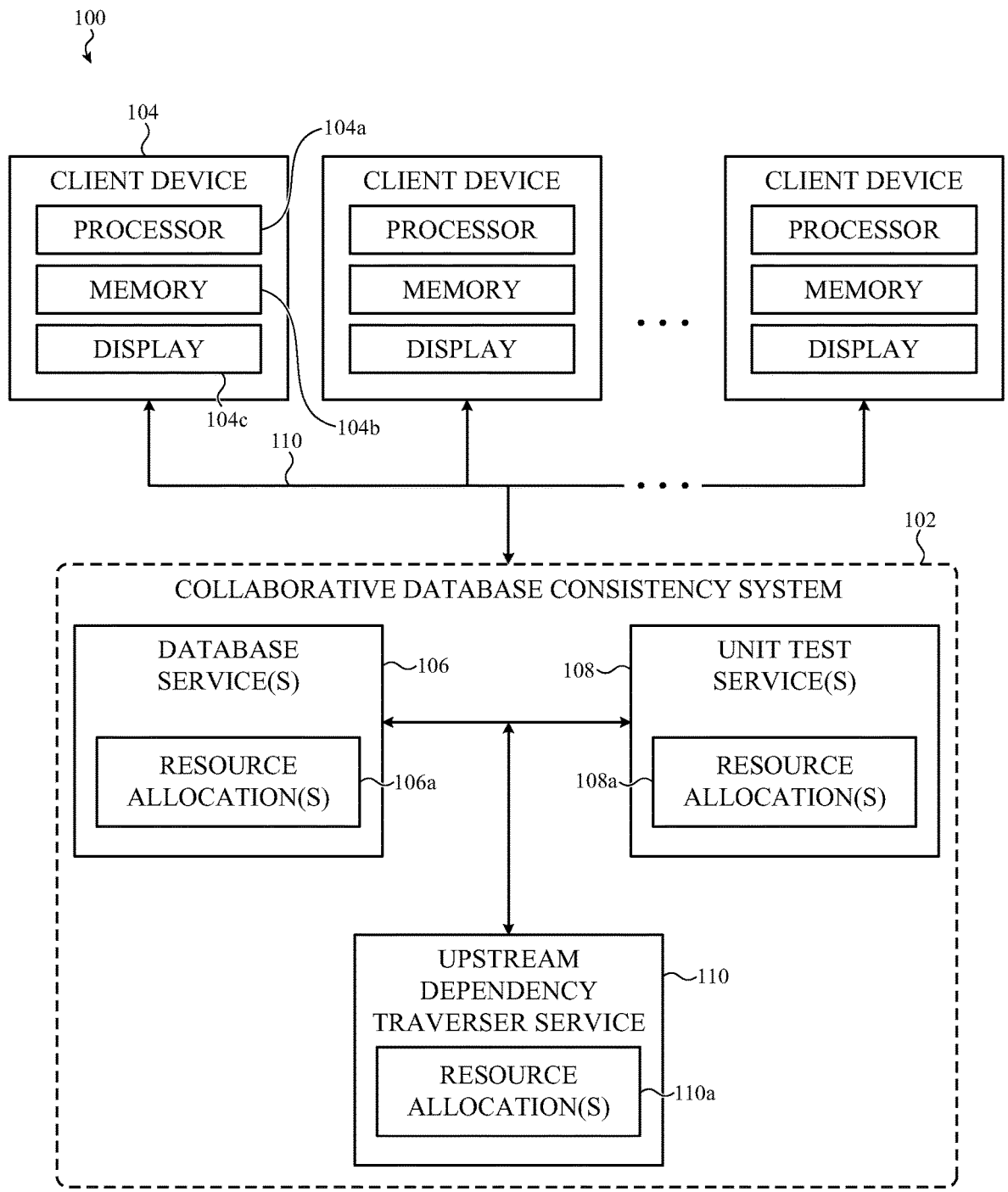
FIG. 1 is a schematic representation of a collaboration tool including a collaborative database consistency system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

An example of a collaboration tool, as described herein, is a project management system or tool that can be implemented in whole or in part as software executed by a virtual or physical server or other computing appliance or combination of appliances that provides a team of individuals with a framework for communicating and exchanging information with one another.

In some examples, a collaboration tool is configured for use by a software development team to exchange information to facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs").

In many cases, such as in these examples, the software development teams and/or projects tracked by the collaboration tool can share access to one or more databases or database tables, such as a table of users or a table of posts. For example, different software products tracked by the collaboration tool may benefit to leverage access to the same user table such that users of one software product can automatically have access to a second software product. In these embodiments, more generally and broadly, the shared databases can support multiple shared or permissioned tables, some of which may be specific to certain projects or software development teams.

For simplicity of description, the embodiments that follow reference a single shared database including multiple tables, however it may be appreciated that this is merely one example database schema type; in other embodiments multiple databases can be used. Further, although many embodiments are described herein with terminology typically used to refer to relational databases (e.g., SQL and the like), it may be appreciated that the systems and methods described herein can likewise be leveraged by non-relational databases (e.g., NoSQL and the like) or other object stores. Independent of database schema, it may be appreciated that a collaboration tool, such as described herein can include a shared database utilized by two or more users or two or more projects of the collaboration tool.

In other cases, as may be appreciated, a collaboration tool can be additionally configured for non-software related purposes, such as for use by a marketing team, an information technology support group, an executive team, and so on. Such non-software uses of the collaboration tool may likewise leverage the shared database. For example, a marketing team may query a user table of a shared database to track user statistics over time.

A collaboration tool and any associated shared database can be architected in a number of suitable ways. For example, a collaboration tool, along with any associated shared databases, can implement a client-server architecture in which a server or service (e.g., a software instance of a server, such as a virtual machine or containerized server) of the collaboration tool exchanges requests and responses (which may comply with a communication protocol such as HTTP, TCP, UDP, and the like), with one or more client devices, each of which may be operated by a user of the collaboration tool. More specifically, in these architectures, a host server of a collaboration tool can serve information to each client device, and in response, each client device can render a graphical user interface on a display to present that information to the user of that respective client device.

In other cases, request-response architecture may not be required; for example a collaboration tool such as described herein can be implemented as a serverless system (e.g., lambda functions and the like), as an event-driven system, or any other suitable system architecture. For simplicity of description, the embodiments that follow reference a collaboration tool including a shared database that implements a request-response architecture, but it may be appreciated that this is merely one example and that any suitable topology can be considered.

However, it may be appreciated that as more individuals, projects, or teams depend upon information stored in a shared database or shared table of a collaboration tool, such as described herein, errors present in the shared database can quickly propagate to disturb the normal and consistent operation of multiple discrete software products. As an organization grows and as databases grow, such errors (even if small) can quickly become extremely difficult to detect and debug, which, in turn, can result in substantial downtime for developers, products, or teams relying upon that data. These problems may be amplified if an organization depends upon a limited group of database engineers to maintain data integrity in a shared database; in such examples, different teams having different requirements may lean on the database engineering team to adjust shared database or relation schemas to suit specific projects or to service specific queries or other requests. Such requests can quickly become burdensome to database engineers and, in some cases as may be known, changing database or relation schemas can have negative consequences for existing software products relying on prior database or relation schemas.

In still other examples, the above-identified problems may be further amplified if an organization depends upon discrete software teams to own and maintain specific tables in a shared database. In such examples, teams relying on data owned by and managed by other teams may have a difficult time maintaining continuous integration deadlines or objectives (because, among other reasons, developer teams may or may not be immediately responsive to other teams' requests to change, edit, or modify tables they own). These problems may be further complicated if teams that do not have their own database management expertise leverage data owned by other teams; for example, a marketing department may rely upon accuracy and freshness of data organized in tables owned by any number of software development teams.

Conventional solutions to the above-identified problems often include manually adding discrete queries or transactions as "unit tests" in a continuous integration (or other) development pipeline. Such unit tests inform a developer of whether data that developer relies upon and owns passes or fails testing (e.g., is stale, is fresh, is within variance ranges, and so on). However, as may be appreciated, adding manual tests to a development pipeline is a time and labor intensive proposition. Further, an express requirement exists that any user adding a test of a database to a particular development pipeline is familiar not only with (1) query languages and/or syntax and efficient database querying techniques, but also (2) with all schemas associated with the database, a requirement that may not be possible to achieve if the user does not own the database or the table the user desires to query.

These problems are further amplified as databases grow and aggregate data tables are added by different groups or users. For example, a marketing team may periodically run a query to determine counts of products sold as a function of user demographics and as a function of shipping address. The marketing team may leverage this information to inform marketing or advertising budgets in particular jurisdictions. This query, or more precisely, this transaction, may be dependent upon numerous tables in a shared database. For example, the transaction may depend, either directly or indirectly upon one or more columns of: a username table; a username-account association table; a product table; a sales table; and so on. An error in any row of any of these tables may cause the marketing data to be unreliable; certain users or products may not be counted correctly if errors are present. Such errors can, if unnoticed, cause the marketing team to rely upon stale, incomplete, or otherwise inaccurate data which, in turn can result in inefficient advertising spend. In other cases, if such errors are noticed by the marketing team, it may take a substantial amount of time to determine which table or tables contains an error and, once determined, which software team or database engineer owns that data and is thus responsible for fixing that error.

To account for these and other shortcomings of conventional collaboration tools and, more generally, systems that leverage shared databases, embodiments described herein include a "collaborative database consistency system" (herein, simply, a "system") or server configured to, in many examples, generate table dependency trees and automatically generate and execute test transactions to verify that each column of each shared table that contributes, in whole or in part, to a result returned in response to a specified query or transaction satisfies a specification for that column. In the event that a single table in a dependency tree associated with a particular query does not satisfy a specified specification, then one or more notifications can be generated and submitted to both owners of the table containing an out-of-spec column or field and, additionally, to any and all owners of queries, transactions, or tables which depend upon the out-of-spec column. In this manner, errors present in a shared database can be quickly and automatically identified, triaged, and corrected and, additionally, any users depending upon that data can be efficiently notified via any suitable graphical user interface that the data may be stale or otherwise unreliable. In many embodiments, a system such as described herein can be configured to run test transactions on a regular interval or scheduled bases, which may vary from table to table or test to test, so that errors introduced can be quickly and efficiently identified.

More simply, systems described herein generally and broadly include a host server or service (which, as noted above, may be a virtual machine instantiated and executed by a processor and/or memory allocation) that receives input from a user of the collaboration tool.

For example, the host server can be configured to communicate with a client device such as described herein. The host server can cause or otherwise instruct the client device to render a graphical user interface to present to a user of the client device. The graphical user interface can present one or more graphical user interface elements that permit the user to specify a table and/or a specific query (or transaction). In these embodiments, the user's selection is an instruction to the system to periodically verify that the data returned by the specified query (or transaction) and/or the data contained in the specified table is valid, as defined by the user. Herein, this data can be referred to as the "data to monitor."

In these embodiments, the graphical user interface instructed to be rendered by the host service on the client device can further include another graphical user interface element to receive the user's selected "test type." The test type defines whether the specified data to monitor is valid. The user's selections of (1) certain data to monitor and (2) a test type are output from the host service and provided as input to a unit test server or service, such as described herein.

Received by the unit test service, the selected test type identifies a particular calculable (or otherwise derivable or obtainable) "metadata characteristic" describing at least a portion of the data to monitor that can be compared against a "specification," which may, but not necessarily, be defined by the user. As used herein, the term "specification" refers to a data structure or function reference that defines a validation condition for a given input, and evaluates to a Boolean result.

Example metadata characteristics that can be calculated, obtained, or otherwise determined by a unit test service in response to receiving a selected test type, such as described herein, include but are not limited to: a last updated date; a column variance over a particular time period; a column maximum; a column minimum; a column z-score; and so on. In other cases, a metadata characteristic can be automatically determined by a statistical analysis of a particular data item or set of data items over a particular time window. An automatically determined metadata characteristic can be used to inform a user whether a particular table contains unusual data or has updated or not been updated in an uncharacteristic manner. For example, in some embodiments, a unit test service can be configured to automatically determine a set of statistical parameters over a given set of time windows for a particular table or set of tables. With these automatically determined parameters, the unit test service can monitor variance to determine whether a particular table or database is operating outside of "normal" or "expected" parameters. For example, in these embodiments, a unit test service may determine, without receiving input defining any particular metadata characteristic to monitor, that a particular table is (with a low standard deviation) updated every two days at midnight. If, at a later time, the table is not updated until 1:30 am, the unit test service can signal that a freshness fault or error has, or may have, occurred. In another example, a unit test service may determine that a particular numerical value associated with a particular column in a particular table does not typically vary by more than 1% within a 3-day time window and does not vary by more than 5% within a 30-day time window. In this example, the unit tests service can signal that a variance fault or error has, or may have, occurred if the particular numerical value varies by 3% in a single day. In this manner, automatically-determined metadata characteristics can be leveraged by a unit test service to monitor various statistical properties of different tables, columns, or queries to determine, over a period of time, what steady-state or otherwise "normal" operating conditions for the tables, columns, or queries are and, likewise, readily identify when a table, column, or query exhibits unusual behavior.

An example metadata characteristic that can be calculated by a unit test service such as described herein is an average of a particular column and an example specification that may leveraged by unit test service to validate the average may be a range of numbers. In this example, the specification evaluates true if the average is within the range and evaluates false is the average exceeds or is below the range. In a more simple phrasing, this example specification answers the question for the unit test service, "does the average of the specified column fall within the specified range?"

In another example, a metadata characteristic that can be determined by the unit test service is a count of null values in a particular column and an example specification that may be leveraged by the unit test service to validate the count may be a bitwise AND with zero. In this example, the specification evaluates true if and only if the determined count equals exactly zero and evaluates false otherwise. In a more simple phrasing, this example specification answers the question for the unit test service, "is {{selected_column}} non-NULL?"

In yet another example, a metadata characteristic that can be determined by the unit test service is a number of days since a particular column was modified and an example specification that may be leveraged by the unit test service to validate the number of days may be a magnitude comparison with the integer two. In this example, the specification evaluates true if and only if the table has been updated in the last two days and evaluates false otherwise. In a more simple phrasing, this example specification answers the question for the unit test service, "is {{selected_table}} fresh?"

In many embodiments described herein, the system further includes an upstream dependency traverser service configured to, as noted above, receive as input the user's selection of data to monitor and, in response, to iteratively or recursively identify each table from which the user's selection depends. In these embodiments, the unit test service can be further configured to determine metadata characteristics, and to validate those characteristics according to suitable specifications, for each table identified in dependency tree output from the upstream dependency traverser service. In this manner, and as a result of this construction, multiple discrete tests can be generated and executed to validate the data to be monitored.

For example, in one embodiment, a user selects Table 1 to monitor and selects a test type to validate that data from Table 1 is updated at least every two days. The host service receiving the user input can provide such input to the upstream dependency traverser service which, in turn can determine that Column 1 of Table 1 depends on Column 2 and Column 3 of Table 2 and Column 3 of Table 3 depends upon Table 4 and Table 4 includes Column 5 which depends upon Column 6 of Table 5. In this example, the unit tests service can calculate for each of Columns 1-6 a number of days since the respective column was modified. Each of these calculations can be compared against a specification evaluating true if and only if the input count is equal to or less than two. In this manner, if Table 5 contains stale data that has not been updated for a week, the unit test service will compare the number seven to the specification number two and evaluate false. This determination can thereafter be used to inform content of a notification to the user indicating that Table 1 may not contain fresh data because a table from which Table 1 indirectly depends (i.e., Table 5) contains stale data.

As noted above, specifications can be defined by users in some embodiments. In other embodiments, however, a specification can be determined from table metadata. For example, a table stored in a database can have metadata indicating that table that defines a latency of two days or less, meaning that data within the table is, if no errors are present, fresh within the last two days. In these examples, a unit test service can access the table metadata to define, at least in part, a specification against which to compare a metadata characteristic determined from data of that table. In other words, a unit test service such as described herein can extract data from the table (or its metadata, which may be stored elsewhere) to inform a determination of whether that data satisfies a specification, such as described herein. In further implementations, a test history or other historical data associated with a particular or given table (or set of tables) to inform one or more determinations about table freshness, table variance, and/or other characteristics. More specifically, in these examples, a table's historical data can be regularly analyzed to automatically determine one or more metadata characteristics that, in turn, can be monitored over time to determine a range of expected or otherwise normal operating conditions; variance from these automatically determined operating conditions can signal to a unit test service that a freshness, variance, or other issue has occurred with the given table under test.

It may be appreciated that these foregoing examples are not exhaustive; in many embodiments a number of different test types can be selected by a user to generate and execute against all determined dependencies of selected data to monitor by a system such as described herein. Further, in many embodiments, user selections of tests to run against specified data to monitor can be stored in a database accessible to any user of the collaboration tool.

In this manner, users of the collaboration tool having experience with database systems can add specific tests (e.g., tests written in SQL or another query language) that evaluate freshness, accuracy, variance, z-score, or other metadata characteristics of various tables or columns stored in that database. These tests (referred to herein as "test transactions") can later be selected by less sophisticated users to perform the same validation operations to the same or different tables.

In further embodiments, results of test transactions can be stored in a time-limited cache or other database such that subsequent requests by a unit test service, such as described herein, can return validation results without necessarily requiring validation operations to be performed again.

As a result of these constructions, a system such as described herein can be easily leveraged by technical and non-technical users alike to conduct regular (e.g., scheduled, at an interval, and so on) evaluations of data stored in a shared database that is of interest to a specific user. Further, as noted above, upon failure and/or success of a test conducted by a unit test service, such as described herein, multiple notifications can be generated. For example, a first user requesting a test of specified data to monitor (the "requesting user") can be notified in addition to a second user or group of users (herein, the "owning user") charged with maintaining data in the particular table or column identified by the unit test service as failing a particular test.

These foregoing and other embodiments are discussed below with reference to FIGS. 1-6. However, those skilled in the art will readily appreciate that the detailed description given herein with respect to these figures is for explanatory purposes only and should not be construed as limiting.

FIG. 1 is a schematic representation of a portion of an example collaboration tool, such as described herein. In the illustrated embodiment, the collaboration tool 100 is implemented with a client-server architecture including a collaborative database consistency system 102 that communicably couples (e.g., via one or more networking or wired or wireless communication protocols) to one or more client devices, one of which is identified as the client device 104.

It may be appreciated that other client devices may be configured in a substantially similar manner as the client device 104, although this may not be required of all embodiments and different client devices can be configured differently and/or may transact data or information with, and/or provide input(s) to, the collaborative database consistency system 102 in a unique or device-specific manner.

The client device 104 can be any suitable personal or commercial electronic device and include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application is configured to access and communicate with the collaborative database consistency system 102 and to securely transact information or data with, and provide input(s) to, the collaborative database consistency system 102. In some embodiments, the client application may be a browser application configured to access a web page or service hosted by the collaborative database consistency system 102 that is accessible to the client device 104 over a private or public network that may, in some embodiments, include the open internet.

In many embodiments, the collaborative database consistency system 102 is configured to operate over a memory allocation and a processor allocation within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the collaborative database consistency system 102 can include a number of discrete subservices or purpose-configured modules, containers, or virtual machines each configured to perform, coordinate, serve, or otherwise provide one or more services, functions, or operations of the collaborative database consistency system 102, such as the operations of (1) serving content of the collaboration tool 100 from a shared database of the collaboration tool 100 to one or more client devices communicably coupled to the collaborative database consistency system 102 and (2) traversing one or more of those databases to identify dependencies therebetween and (3) generating and executing validation tests against those databases.

For example, as noted with respect to other embodiments described herein, the collaborative database consistency system 102 can be configured to receive from a client device, such as the client device 104, an input including an indication of data stored in a shared data to monitor and, additionally, a type of test to generate and execute against that data to validate that the data is reliable, valid, accurate, precise, or otherwise useful to a user, the requesting user, of the client device 104. With this input the collaborative database consistency system 102 can retrieve or otherwise obtain a database or relation schema describing the data to monitor (e.g., a table schema if the data to monitor is a table, or a series of table schemas invoked by a query or transaction if the data to monitor is a query or transaction). In these examples, the collaborative database consistency system 102 can parse the retrieved schema and can determine which tables, columns, or other data sources the data to monitor directly depends (also referred to as a first order dependency).

Once this listing of tables, columns, and other data sources is obtained, the collaborative database consistency system 102 can, once again, retrieve or otherwise obtain a database or relation schema describing each respective data source upon which the data to monitor directly depends, parse said respective schemas/definitions, and obtain another listing of data sources upon which the first order dependencies of the data to monitor themselves depend (also referred to as a second order dependency).

It may be appreciated by a person of skill in the art that the collaborative database consistency system 102 can proceed in this manner, in a recursive (e.g., depth first) or iterative (e.g., breadth first) manner until all dependencies of the data to monitor, whether such dependencies are direct dependencies or indirect dependencies, are known. With this information, the collaborative database consistency system 102 can construct a dependency tree, or other suitable data structure, identifying all tables (or, in some examples, all columns or other data sources) upon which the data to monitor directly or indirectly depends and, additionally, identifying upstream/downstream dependency relationships between those tables. The recursive or iterative approach adopted by the collaborative database consistency system 102 may terminate once each may terminate at a node (e.g., a leaf) of the dependency tree once that node no longer depends upon any other table, column, or data source. In other words, traversal of the various upstream dependencies of a given data to monitor may stop once all leafs of the dependency tree comprise data directly entered to the shared database.

In some cases, although not required, the collaborative database consistency system 102 may terminate recursion or iteration on a particular dependency path once a specified depth is reached. In other cases, the collaborative database consistency system 102 may terminate recursion or iteration at a particular node or leaf upon establishing that the data source of that node or leave is a deterministic data source guaranteed to provide valid data. These are merely examples, and this listing is not exhaustive of the triggers that may cause a traversal of various upstream dependencies of a given data to monitor to terminate; a person of skill in the art will appreciate that in a number of suitable implementations, the collaborative database consistency system 102 can be instructed to generate a dependency tree, such as described herein in a number of suitable ways, having a number of suitable leafs, branches, and trunks some of which may be deterministic, static data, or may have intentionally uncaptured upstream dependencies themselves.

Independent of the method of procedure used to generate a dependency tree, such as described herein, once the collaborative database consistency system 102 has established a dependency tree for a given data to monitor (which, again, may be a table of a shared database or a query or transaction to obtain data from one or more tables of a shared database), that dependency tree can be leveraged to automatically generate a number of suitable tests that, when executed, provide valuable information about the validity, freshness, accuracy, precision, and/or another characteristics of the data to monitor.

For example, as noted above, the collaborative database consistency system 102 is configured to receive from the user of the client device 104 an indication of a test type to generate and execute to validate the data to monitor. The "test type" selected by the user can be any suitable test type, identified in any suitable manner. However, for embodiments described herein, each test type is associated with a particular "metadata characteristic" that is calculable or otherwise obtainable by the collaborative database consistency system 102 and a method for validating that metadata characteristic, referred to herein as a "specification." As one example, a metadata characteristic may be a latency of data stored in a particular table identified by the dependency tree. Latency, in this context, refers to the freshness or newness of data and/or the frequency with which data is updated or validated. Latency may be typically represented by, or obtained from, a date or time object stored in a metadata field associated with a given table recording a timestamp or datestamp at which the given table was last updated. It may be appreciated that different tables or different data in a shared database may be associated with different latency, and different latencies may be acceptable, preferred, or required in different contexts.

For example, a shared database storing information related to a social media platform can include a user table and a post table. In these examples, a different latency can be associated with individual columns of each table (e.g., when was a "username" or "user_id" column of the user table last updated), rows or records of the table (e.g., when was record_id=0 last updated), or of the table itself (e.g., when was "user" table last update). In these examples, as noted above, different latencies may be associated with different indications of valid or invalid data. For example, if a posts table is updated less than once per day, data in the posts table may be lagging or another error in the system may be preventing data to be merged into the posts table.

Accordingly, independent of specific requirements for a particular embodiment or implementation, it may be appreciated that once a particular metadata characteristic is determined, or otherwise obtained, by the collaborative database consistency system 102, it can be validated such as described herein by evaluating the metadata characteristic against a specified specification. For example, a latency metadata characteristic can be evaluated with a specification requiring no more than two days since a most recent update to evaluate true. In these examples, the collaborative database consistency system 102 can determine that a particular table or data source "passes" a test, and is thus valid according to that test, only when data sourced from that table or source has been updated within the last two days. In such examples, the collaborative database consistency system 102 can be configured to generate a notification to be displayed via the display 104c of the client device 104 to inform a user (the requesting user) of the client device 104 that a particular validation test of the data to monitor has failed. In some examples, the notification can also be sent to an owner of the table (the owning user), from which the data to monitor depends, that did not pass validation. In many cases, the notification(s) sent by the collaborative database consistency system 102 identify tables or columns that fail validation.

In other embodiments, the collaborative database consistency system 102 may be further configured to determine a different importance to different tests generated and executed against data to monitor. For example, some tests may be "critical" tests, whereas other tests may be "non-critical" tests. In these examples, the collaborative database consistency system 102 may notify a requesting user only if a critical test fails. In other cases, the collaborative database consistency system 102 may be configured to notify only the owning user if critical tests fail.

It may be appreciated that in further embodiments, importance identifiers may not be binary. Different importance identifiers can be associated with notifications presented to different users (e.g., only to the requesting user, only to the owning user, only to a data engineer, to a requesting user and to the owning user, and so on), with different subsequent tests to be performed in response to a validation failure, and so on.

Independent of test type, specification (and origins thereof, whether received from the requesting user or obtained from table or database metadata), and/or metadata characteristics, a collaborative database consistency system, such as the collaborative database consistency system 102 described herein, can be configured to generate tests to execute against the selected data to monitor in a number of suitable ways.

For example, in some embodiments, the collaborative database consistency system 102 can be communicably coupled to a test database and/or a test template database populated with SQL or other query string templates that can be populated with data specific to a particular requesting user's requirements. An example test template, in SQL, stored as a string in a template database that may be used to to average float values stored in a column of a selected table "SELECT AVG(CAST(ColumnName as FLOAT)) FROM TableName." In this example, the collaborative database consistency system 102 can leverage this template (e.g., by replacing the values ColumnName and TableName with appropriate string values) to calculate a metadata characteristic that averages values of a particular column of a particular table to compare against a given specification. In these embodiments, as a result of the template, a requesting user desiring to validate a particular table based on an average value of a column of that table need not have familiarity with SQL. In this manner, a template database such as described herein can enable a higher level of abstraction above raw queries or transactions with shared databases and, as a result, the collaborative database consistency system 102 may be utilized by both database engineers and non-technical users alike.

It may be appreciated that the foregoing example is not exhaustive of the various test templates that may be stored in, or otherwise provided by a test template database associated with the collaborative database consistency system 102, such as described herein. To the contrary, in many embodiments, the collaborative database consistency system 102 may be further configured to create a template based on one or more inputs provided by requesting users. For example, in some embodiments, a requesting user may specify particular SQL queries to execute for a particular test. In these embodiments, the collaborative database consistency system 102 can generalize or otherwise templatize the tests specified by the user (e.g., by replacing column names with replaceable tokens, by replacing table names with replaceable tokens, and so on) and store the newly-generated template in the template database such that other users of the collaborative database consistency system 102 can leverage the same test input manually by previous users.

In this manner, more generally and broadly, the collaborative database consistency system 102 can be configured to collect and aggregate validation tests that validate data for particular tables or particular data types across an entire organization using the collaboration tool 100. As a result, over time, a database of template tests can be created that can be selected by and leveraged by database engineers, data scientists, developers, and non-technical team members in order to automatically generate and execute validation tests across all dependencies of a particular table, column, or data source. Once such tests are generated (e.g., by populating one or more templates based on data extracted from a dependency tree), execution of those tests can be scheduled based on a selected interval (e.g., which may be automatically determined or determine by a requesting user) or, in other cases, in response to particular triggers specified by the requesting user. Any number of suitable triggers may be considered for particular embodiments including, but not limited to: new data added to a particular specified table or database; an update is received to a particular table or database; a request to manually run a set or series of tests is received; and so on. It may be appreciated that these foregoing examples are not exhaustive and that any number of suitable triggers may be selected.

Accordingly, for simplicity of description and for purposes of illustration, the embodiments that follow reference a collaborative database consistency system configured to receive from a user (1) an indication of a table to be monitored, (2) a selection of a freshness test type to generate and execute, and (3) a selection of an interval at which to execute each generated freshness test. In this example embodiment, the collaborative database consistency system can be configured to determine freshness of each and every table upon which at least one column of the selected table depends. If any of these tables, which as noted above are identified in a dependency tree generated by the collaborative database consistency system, fail validation (meaning, in this example, that data of that respective table exhibits a latency exceeding a threshold latency defined by a table-specific specification), a notification can be sent to the requesting user and to the owning user associated with the table failing validation.

In one example, the requesting user may be a member of a marketing team. The requesting user can use a client device to select (1) a marketing data aggregation table that aggregates user data of all users of multiple software products, (2) a freshness test type, specifying that the marketing data aggregation table should not have more than two days of latency, and (3) that the test should run every two days. In response to these selections, the collaborative database consistency system generates a dependency tree based on a relation schema (and/or a database schema) defining the marketing data aggregation table and determines that the marketing data aggregation table depends upon five separate software products which, in turn each at least a user_id tables and user_profile tables. Statistics describing each user's interaction with each software product appear in each user_profile table and, in turn, each depend upon five different user interaction tables, storing user interactions with particular portions of each of the five software products. In this example, upwards of forty tables may be direct or indirect dependencies of the marketing data aggregation table and may be identified in the dependency tree. Optionally, the collaborative database consistency system may de-duplicate or otherwise graphically reduce the dependency tree, but this is not required. Once a (optionally reduced) dependency tree is generated by the collaborative database consistency system, validation tests for latency can be generated for each table identified in the dependency tree. These tests can be executed every two days, according to the schedule defined by the requesting user.

At a later time, bad data may be introduced to one of the user_profile tables. For example, another software product tracked by the collaboration tool may insert NULL data into a column of the user_profile table, which, in turn, can cause a field dependent upon that value to also be NULL or to otherwise fail. In this example, the user_profile table may not be successfully updated for a period greater than two days at which point the collaborative database consistency system may determine that the latency of the specified user_profile table has exceeded specification. Upon this determination, a notification can be sent to a team of engineers owning the user_profile table noting that the table contains bad data and/or stale data. In response the team of engineers may begin debugging the problem identified by the notification. In some examples, the collaborative database consistency system can be configured to automatically generate a trouble ticket identifying the database, the table, and/or the column determined to cause one or more failures, but this is not required of all embodiments. In addition to notifying the owning user(s), the collaborative database consistency system can be configured to notify the marketing team user that was the original requesting user.

As a result of this construction, from the perspective of the marketing team, the collaborative database consistency system automatically generates a warning indicating that "marketing data aggregation table is not fresh" and may not be reliable. Similarly, from the perspective of the engineering team owning the failing table, the collaborative database consistency system generates a prompt notification (and/or opens a trouble ticket automatically) to assist that team in debugging its own table.

In some examples, the collaborative database consistency system can be further configured by the engineering team to trigger a second set of validation tests if and only if another team's validation tests indicate that the engineering team's data is stale. For example, the engineering team may add a test to the collaborative database consistency system, triggered by a failed freshness test, that determines whether any data in the failed table is NULL. More specifically, the metadata characteristic specified by this test may be a count of NULL values and the specification evaluating whether this count passes or fails based on whether the count is zero or nonzero. As a result of this construction, the engineering team can automatically receive a notification, upon failure of a table in response to a marketing team's validation test(s), that informs the engineering team that, "user_profile table is not fresh; FailColumn contains NULL data." In some cases, even further context may be provided automatically. For example, in some embodiments, the notification may read or include information indicating that "user_profile table is not fresh; FailColumn contains NULL data and was last modified by [database user 12345/software product X]."

As may be appreciated, such concise information dramatically decreases debugging time for the engineering team and dramatically decreases downtime for both the engineering team and the marketing team. In this manner, instead of relying upon individual teams and individual table owners to maintain data integrity (e.g., by manually adding tests important to only that group), each team of an entire organization utilizing a shared database can add their own database tests (analogous to "unit tests") which, in turn, can directly improve the data quality of direct or indirect dependencies. In a more simple and non-limiting phrasing, the systems described herein enable teams of users of a collaboration tool to (1) automatically add database/table/column validation tests to validate data important to that user or team, even if that user or team does not have database experience or expertise, (2) to automatically add database/table/column validation tests to all tables from which the monitored data depends, and (3) to automatically notify that team of detected reliability issues.

From another perspective and in another non-limiting phrases, owners of database tables are no longer tasked with individually adding validation/unit tests to their own databases in order to service requests from other groups. Instead, such tests are automatically added to each relevant database/table/column without intervention by the table's owners. As may be appreciated, the greater the quantity of testing, the more reliable a production environment will be.

It may be appreciated that over time, as teams using a collaboration tool, such as described herein (e.g., the collaboration tool 100) add tests to the collaborative database consistency system, and additionally, add tests that are triggered in response to failures of other tests, collaboration of those teams together can operate to quickly and efficiently identify errors or other bugs or issues in any table of the shared database or, more generally, in software products responsible for adding or manipulating data within the shared database.

Embodiments described herein can configure the collaborative database consistency system 102 in a number of suitable ways. In one embodiment, depicted in FIG. 1 the collaborative database consistency system 102 of the collaboration tool 100 can include a database service 106, a unit test service 108, and an upstream dependency traverser service 110. As described with other embodiments presented herein, the database service 106 can be configured to host one or more shared databases of the collaboration tool 100, the unit test service 108 may be configured to generate one or more "unit tests" of tables and/or columns of those tables based on input(s) received from a requesting user (e.g., via the client device 104) and input(s) received from the upstream dependency traverser service 110 which, in turn, may be configured to determine all tables and columns from which a particular table or column of data depends.

In these embodiments, the database service 106 can serve content from, and/or service transactions with or queries of, one or more databases (e.g., content databases) that store content that may be configured to be displayed on, or otherwise accessed by, a display of a client device, such as the display 104c of the client device 104. The content stored in the content database of the content service 106 can be any suitable content associated with any suitable feature or function of the collaboration tool 100 and/or the collaborative database consistency system 102.

In many embodiments, the content service 106 is configured to host a communication interface, such as an Application Programming Interface ("API") that may be accessed by one or more components or modules of the collaborative database consistency system 102 and/or one or more remote devices, such as the client device 104. The API hosted by the content service 106 can gate or otherwise control access to content stored in the database(s) of the content service 106. For example, the content service 106 may respond only to authenticated queries. In other cases, the content service 106 may provide database input sanitization operations.

As with other embodiments described herein, the unit test service 108 of the collaborative database consistency system 102 of the collaboration tool 100 can be configured in a number of suitable ways to, among other operations, to process a dependency tree (e.g., from the upstream dependency traverser service 110) and to generate tests and to execute tests based on each table identified by the dependency tree.

It may be appreciated that the foregoing examples (and or network/system architectures) are not exhaustive. Accordingly, it is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the collaboration tool 100 of FIG. 1 can be implemented in a number of suitable ways. As illustrated, the collaborative database consistency system 102 includes one or more purpose-configured modules or components each configured to perform a discrete task associated with the operation of the collaboration tool 100.

In particular, as noted above, the collaborative database consistency system 102 includes various purpose-configured modules or subservices. It may be appreciated that although these functional elements are identified or referred to as separate and distinct "servers" or "services" that each include allocations of physical or virtual resources (some of which are identified as the resource allocations 106a, 108a, and 110a)—such as one or more processors or processor allocations, memory or memory allocations, and/or communication modules (e.g., network connections and the like)—that such an implementation is not required. More generally, it may be appreciated that the various functions described herein of a collaborative database consistency system 102 can be performed by any suitable physical hardware, virtual machine, containerized machine, or any combination thereof.

For example, a system such as described herein can be configured to perform additional or alternative operations in response to a determination that a particular test or series of tests has failed. As noted above, in many embodiments, a notification or more than one notification may be sent to particular interested parties. However, in other embodiments, this may not be required and notifications may be sent only to those individuals or teams who have subscribed to receive such notifications. In other cases, notifications can be grouped or otherwise aggregated into a report circulated to interested users or parties at a regular basis (e.g., weekly, daily, monthly, quarterly, and so on). In still other examples, other operations may be performed such as reverting one or more transactions, reverting to a previous state of one or more databases, substituting one database for another (e.g., a backup), providing a service-level agreement compliance warning, notification or report, or any other suitable operation.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2:
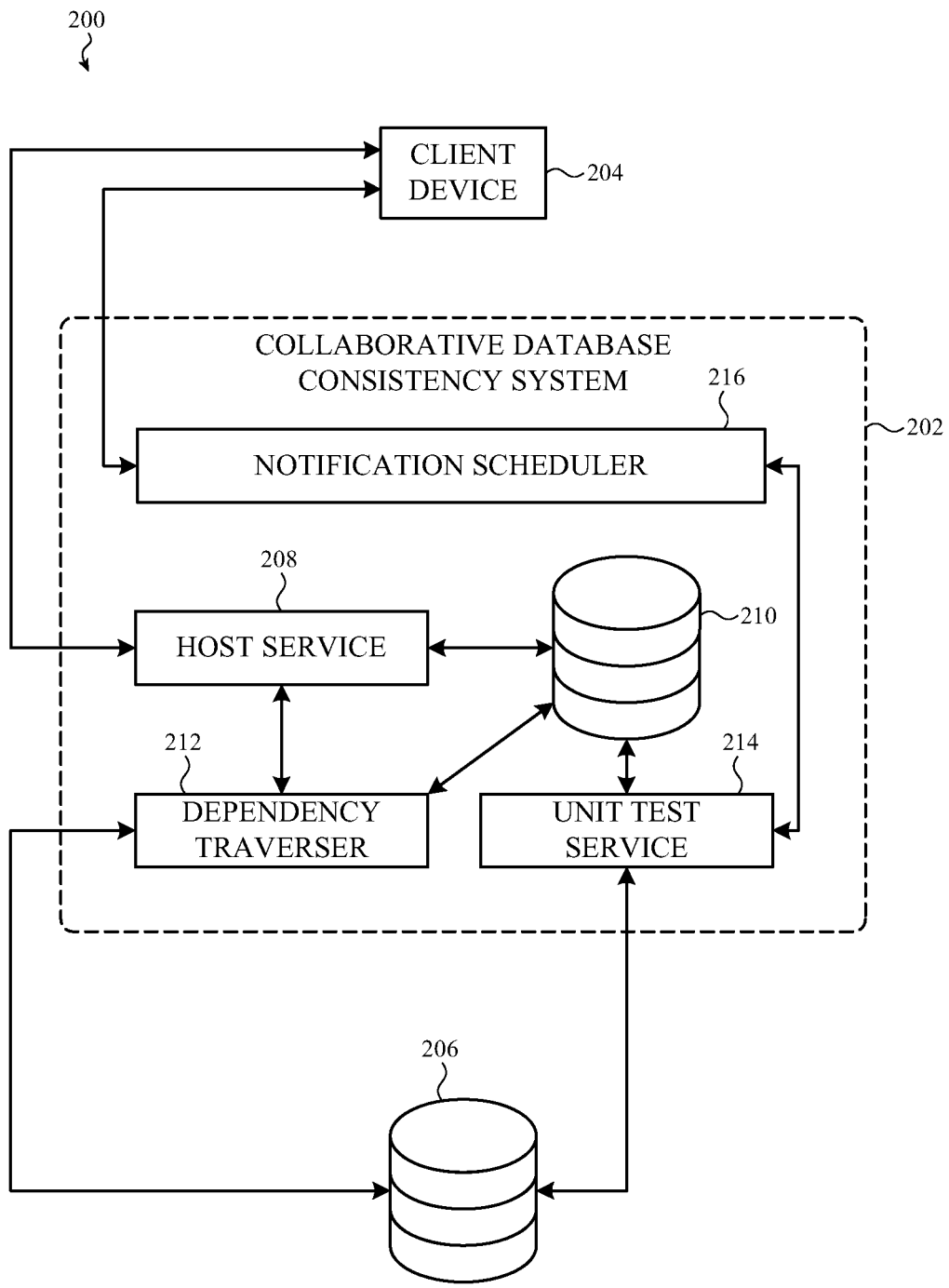
FIG. 2 depicts a signal flow diagram of a collaborative database consistency system, such as described herein.

FIG. 2 depicts a signal flow diagram of a collaborative database consistency system, such as described herein. The diagram 200 depicts various signals and/or communication couplings between example subsystems or services of a collaborative database consistency system 202 and a client device 204 to maintain consistency in a shared database 206. It is appreciated that this example construction is one example construction of a system such as described herein; the various signals and signal paths depicted are understood to be mere examples. Other configurations and signal flows may be possible in other implementations.

Similarly, although the subsystems and modules depicted in FIG. 2 are shown simplified, it is appreciated that any of the depicted subsystems or subservices may be independently implemented on dedicated hardware (or a cluster of dedicated hardware) or, in other examples, may be independent instances of software/service applications. In particular, in these embodiments, each depicted module or subsystem/subservice may be described in computer readable instructions stored in a memory, whether that memory is physical memory or is an allocation of physical memory (herein, a "memory allocation") associated with a virtualization or containerization or serverless computing environment. In these examples, processor allocations can be configured to access the respective memory allocation(s) to retrieve and execute the computer readable instructions stored therein to instantiate one or more instances of a system or subsystem such as described herein and/or such as depicted in FIG. 2. In particular, in these examples, a processor allocation and a memory allocation, as one example, can cooperate to instantiate, without limitation: the host service 208; a system database 210 (also referred to as a test template database); an upstream dependency traverser service 212; a unit test service 214; and a notification scheduler 216.

In this construction, the host service 208 can be configured to transact information with the client device 204. More specifically the host service 208 can be configured to send one or more signals to the client device 204 to cause the client device 204 to generate a user interface and display that user interface to a user of the client device 204 to solicit input to and to provide output to that user. In many examples, as noted with respect to other embodiments described herein, the graphical user interface rendered for the user by the client device 204 can receive input from the user including, but not limited to: (1) a selection of data to monitor (e.g., a table, a column, a transaction, a query, and so on); (2) a test type to run on the data to monitor (and correspondingly on all upstream dependencies); (3) and, optionally, a schedule or interval at which to run the tests generated.

Once the user selections and/or other user input are received from the client device 204, and in particular by the graphical user interface of the client device 204, such inputs can be output to the host service 208 and can be received by the host service 208 as input which, in turn can provide the user inputs to the upstream dependency traverser service 212. The upstream dependency traverser service 212 can receive the user inputs and generate therefrom a dependence tree listing all tables of the shared database 206 that are upstream dependencies, either direct or indirect, of the data to monitor selected by the user.

Once the upstream dependency traverser service 212 generates the dependency tree, the unit test service 214 can access (e.g., via the system database 210) the dependency tree or, alternatively can receive the dependency tree as input directly from the upstream dependency traverser service 212 (a connection between these elements is not shown in FIG. 2, but it is appreciated that these modules and/or subservices may be communicably coupled in ways other than that which is depicted).

Once the unit test service 214 receives the dependency tree, the unit test service 214 can generate one or more tests based on the test type selection by the user received by the host service 208. In particular, as with other embodiments described herein, the unit test service 214 can iteratively or otherwise (e.g., recursively) generate and execute tests for each or at least one of the tables identified by the dependency tree. More specifically, the unit test service 214 can be configured to generate queries and/or test transactions against one or more tables of the shared database 206 to obtain one or more metadata characteristics that, in turn, can be evaluated according to a specification that evaluates to true or false. The specification may be table-specific or may be specified by the user of the client device 204. Optionally, the queries and/or test transactions generated by the unit test service 214, and/or the results thereof, can be stored in the system database 210 for later convenient and/or cached access.

Figure 3A:
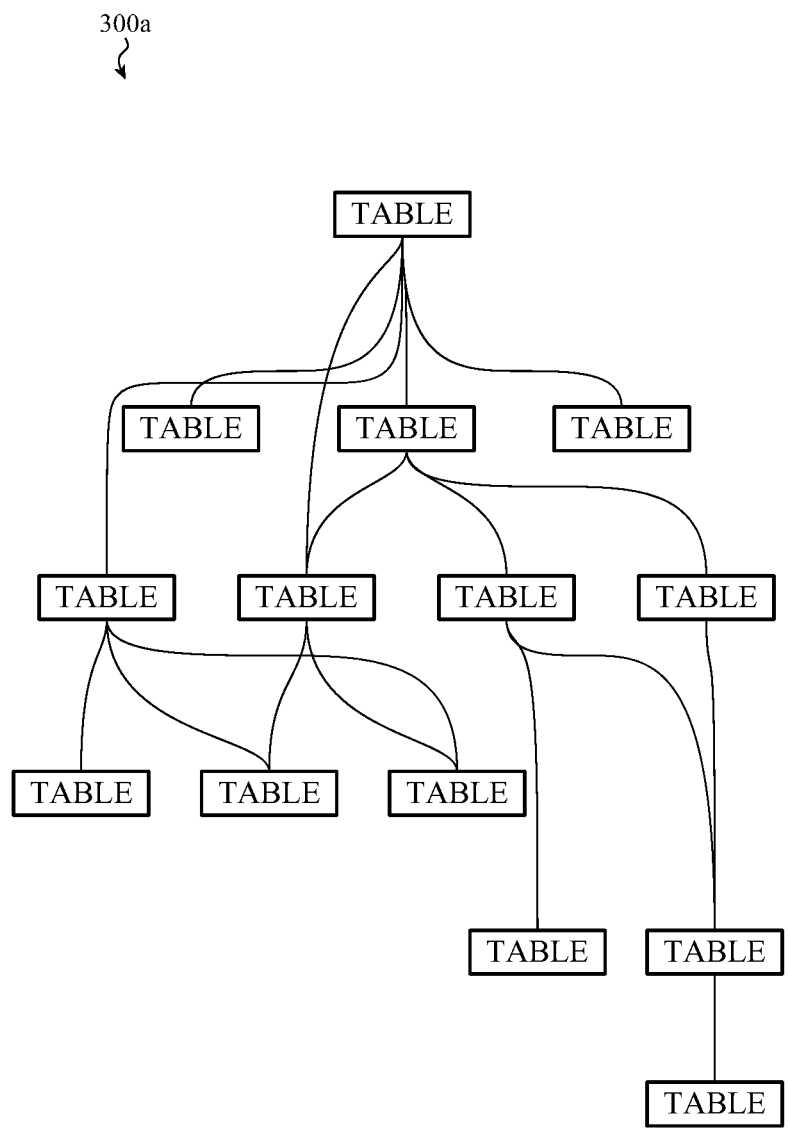
FIG. 3A depicts an example dependency tree depicting associations between tables of a database.

As noted above, a upstream dependency traverser service of a system such as described herein may be configured to determine a dependency tree for a given table or a given transaction that queries one or more tables to produce a resulting dataset. For convent reference, FIG. 3A is provided depicting an example dependency tree, identified as the dependency tree 300a, showing an upstream dependency tree relating data contained in various tables to one another. Dependencies between tables can be defined, as may be understood by a person of skill in the art, in a number of ways. For example, certain columns of one table may be calculated from values retrieved from other columns of the same table. In other cases, a single column may depend upon data extracted from other columns of other tables. It may be appreciated that the example provided in FIG. 3A is merely one of an infinite number of possible dependencies, associations, or other relationships between different tables of one or more databases. The dependency tree 300a can be determined, constructed, or otherwise established (e.g., as a data structure or other descriptive, computer-readable or parseable object) by an upstream dependency traverser service recursively or iteratively, and may be utilized by a collaborative database consistency system, such as described herein, to define one or more tests appropriate to evaluate properties of the "root" table. The results of such tests can be displayed to a user of the system to inform the user of an appropriate action to take to maintain data quality.

Figure 3B:
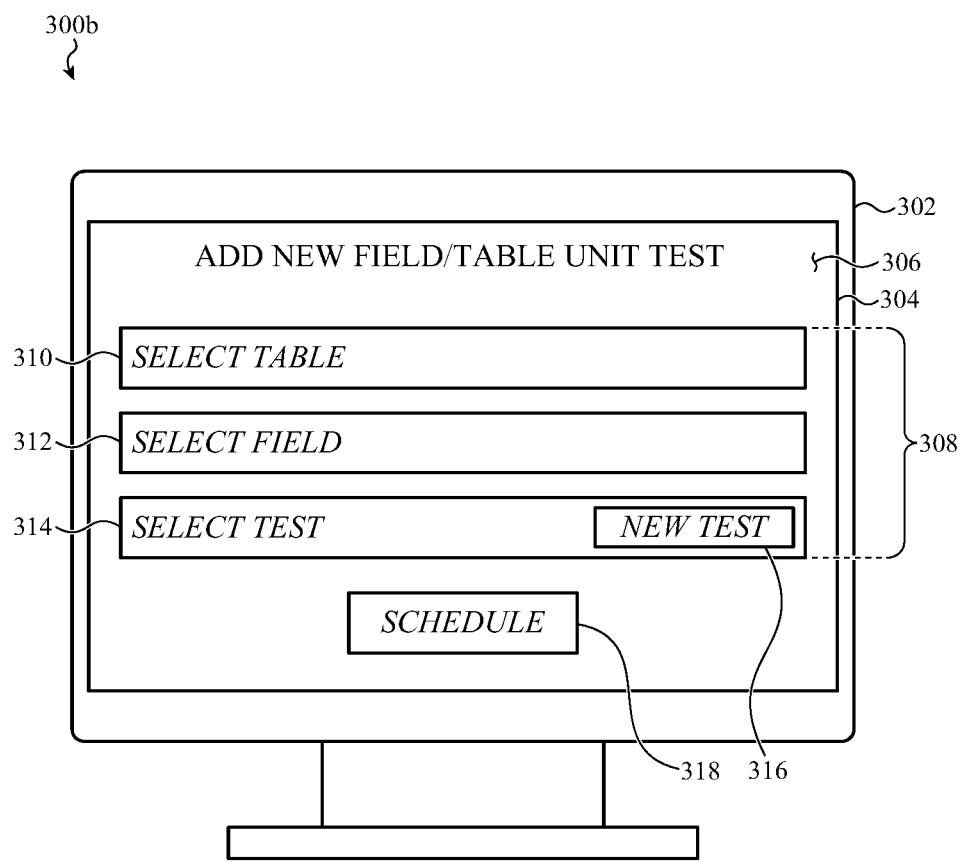
FIGS. 3B-3D example user interfaces associated with a collaborative database consistency system, such as described herein.

FIG. 3B depicts an example user interface associated with a collaborative database consistency system, such as described herein. In particular, the depicted client device, identified as the client device 300b can include a display 302 with an active display area 304 that is configured to render a graphical user interface 306. The graphical user interface 306 can include a number of discrete fields to solicit input from a user and/or to provide output to a user. In the depicted embodiment, a set of input fields 308 includes a table selection interface element 310, a field or column selection interface element 312, and a test type selection interface element 314. As described with respect to other embodiments presented herein, the table selection interface element 310 can be configured to present a listing of tables, or a subset thereof, accessible to the user operating the client device 300b. From this listing, the user may select one or more tables against which to run validation tests. In other cases, or in some examples, the user may opt to select a particular column or set of columns from the selected table against which to run validation tests. In this circumstance, the user may leverage the field or column selection interface element 312 to provide appropriate input.

Similarly, as described with respect to other embodiments presented herein, the test type selection interface element 314 can be configured to present a number of different test types that may be available to the user of the client device 300b. In some cases, the listing of test types can be extracted from a system database (such as the system database 210 as shown in FIG. 2) or can be provided based on other inputs or other tests previously added to the collaborative database consistency system. In some cases, the listing of tests types can be filtered based on the user's selection of table against which to run the selected test(s). For example, if a particular database table includes only static data, a freshness test may not be appropriate to conduct and, thus, may be filtered from (e.g., omitted from) the listing of test types shown to the user. In some cases, the user may prefer to add a new test; in these examples, the user may select the new test button/input element 316.

Once the user has made appropriate selections, the user can press the a confirmation button, such as the scheduler button 318, to instruct a collaborative database consistency system, such as described herein, to proceed to generate one or more tests and to execute the generated tests according to a schedule or interval.

Figure 3C:
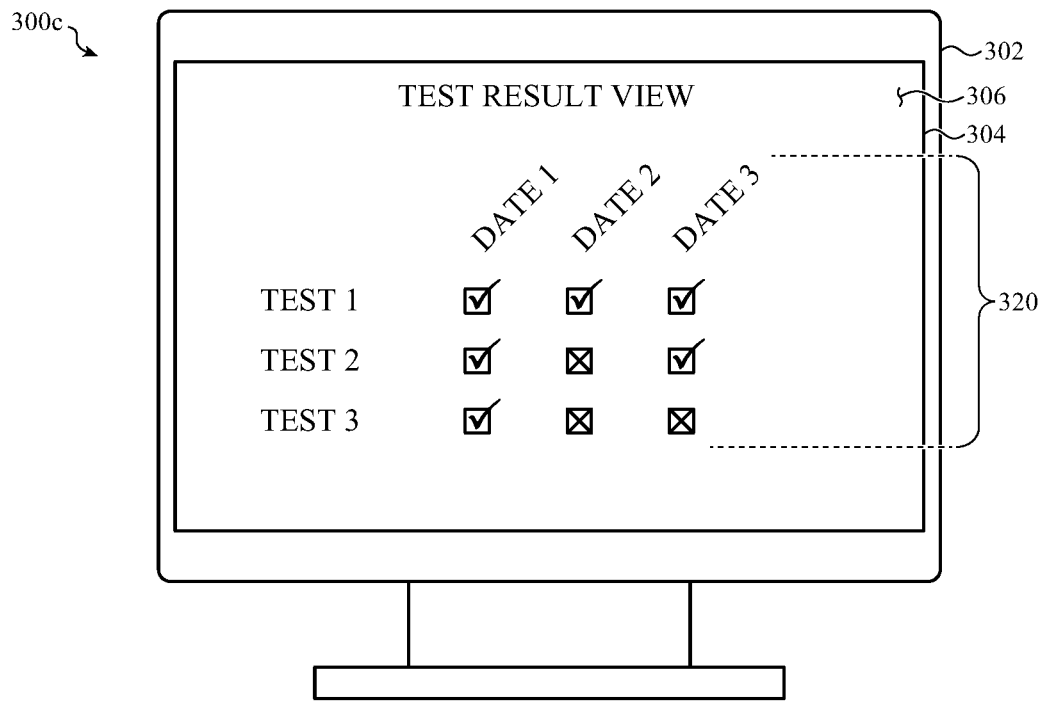
Figure 3D:
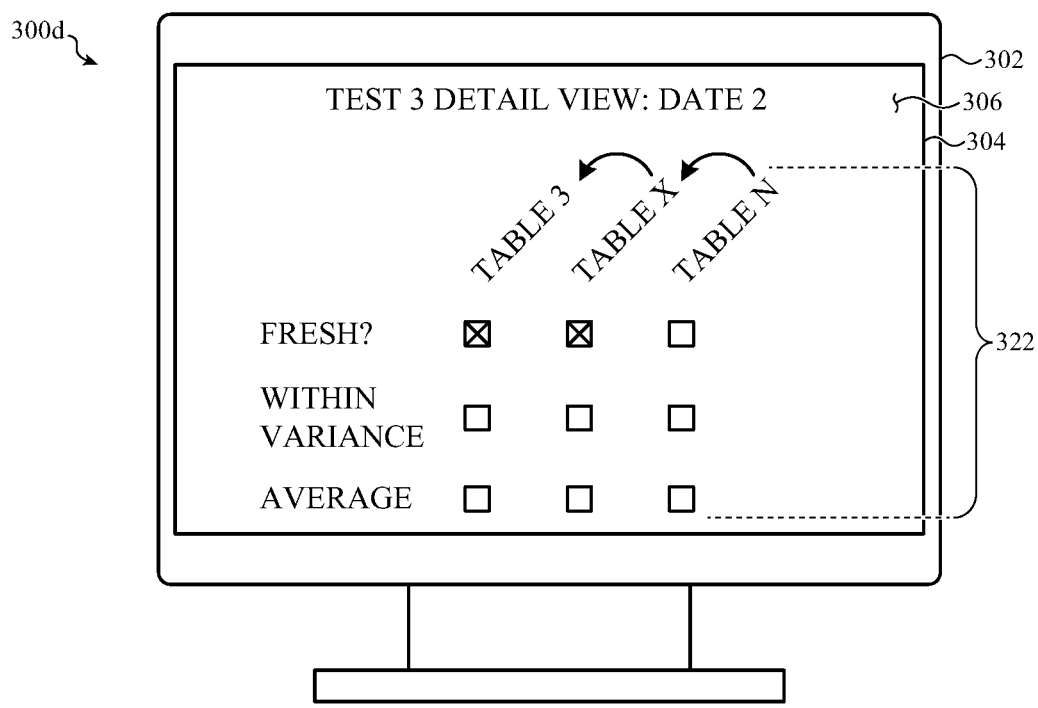

FIGS. 3C-3D depict additional example user interfaces associated with a collaborative database consistency system, such as described herein. In these examples, the client device (identified as the client device 300c and 300d respectively), the display 302, the active display area 304, and the graphical user interface 306 all function in the same manner as described above with respect to FIG. 3B; these descriptions are not repeated.

In particular, FIG. 3C depicts a graphical user interface 306 showing a dashboard 320 that may be leveraged by a user of the system to triage errors or other issues identified by the system at particular times relative to particular tables under test. For example, in the simplified dashboard shown in the figure, the dashboard 320, three different tables are shown and the results of unit tests run by the system at three different dates are also shown. In the figure, passed unit tests are indicated with a different symbol (a check mark) than failed unit tests (a cross) for fast and easy visual identification of failed unit tests. In other embodiments, other methods can be used to visually distinguish failed tests from passed tests including but not limited to: animations; color variations; size differences; sounds; and so on. As a result of a user interface such as shown in the dashboard 320, a data engineer or other user of the client device 300c can readily determine a date at which a particular test—add by or otherwise tracked by the user—failed or began failing.

In some cases, a user of the client device 300c may prefer to understand more detail about successful or unsuccessful unit tests. As such, as may be appreciated by a person of skill in the art, additional user interfaces may be provided to drill down into one or more user interface elements of the dashboard 320. For example, FIG. 3D depicts a detailed view of Test 3 when executed by the system at Date 2. In this example, a second, different dashboard can be shown that provides detailed analysis showing which table and/or tables introduced an error that resulted in a unit test failing. In particular, the dashboard 322 indicates that Table X, from which Table 3 depends, is not fresh despite that Table N, from which Table X depends is fresh. In this example, an owner of Table X may have received a notification on Date 2 including information indicating that Table X is no longer fresh.

The foregoing examples are not exhaustive. It may be appreciated that any suitable presentation of data related to unit tests are possible in view of the various embodiments, data sources, and metrics presented herein.

Generally and broadly, FIGS. 4-7 depict methods of operating a collaborative database consistency system, such as described herein. It is appreciated that these methods and, in particular, the various depicted and described operations, and not exhaustive of the various stops or operations that may be performed by a system or service such as described herein to perform, coordinate, or oversee an operation of a collaborative database consistency system. For example, additional or alternative operations may be required or preferred in specific implementations. In addition, it may be appreciated that various operations may be merged, performed simultaneously in lieu of sequentially, may be performed in another order, or may be omitted entirely.

These operations each can be formed in whole or in part by a module or service of a system, such as described herein. For example, as noted with respect to other embodiments provided here, a service such as a host service, an upstream dependency traverser service, or a unit test service may be operated by or on dedicated server hardware, including a physical processor, a network connection for sending and receiving electronic communications, and a memory used to store instructions suitable to, when executed by the respective processor, instantiate a software service capable to provide at least one function of the respective module, such as described herein. In other computing environments, especially those implemented with virtual computing and/or containerization paradigms, a processor allocation can cooperate with a memory allocation to instantiate one or more of the services/subservices described herein. As such, more generally and broadly, it may be appreciated that a system such as described herein can be operated according to methods such as those described below.

Figure 4:
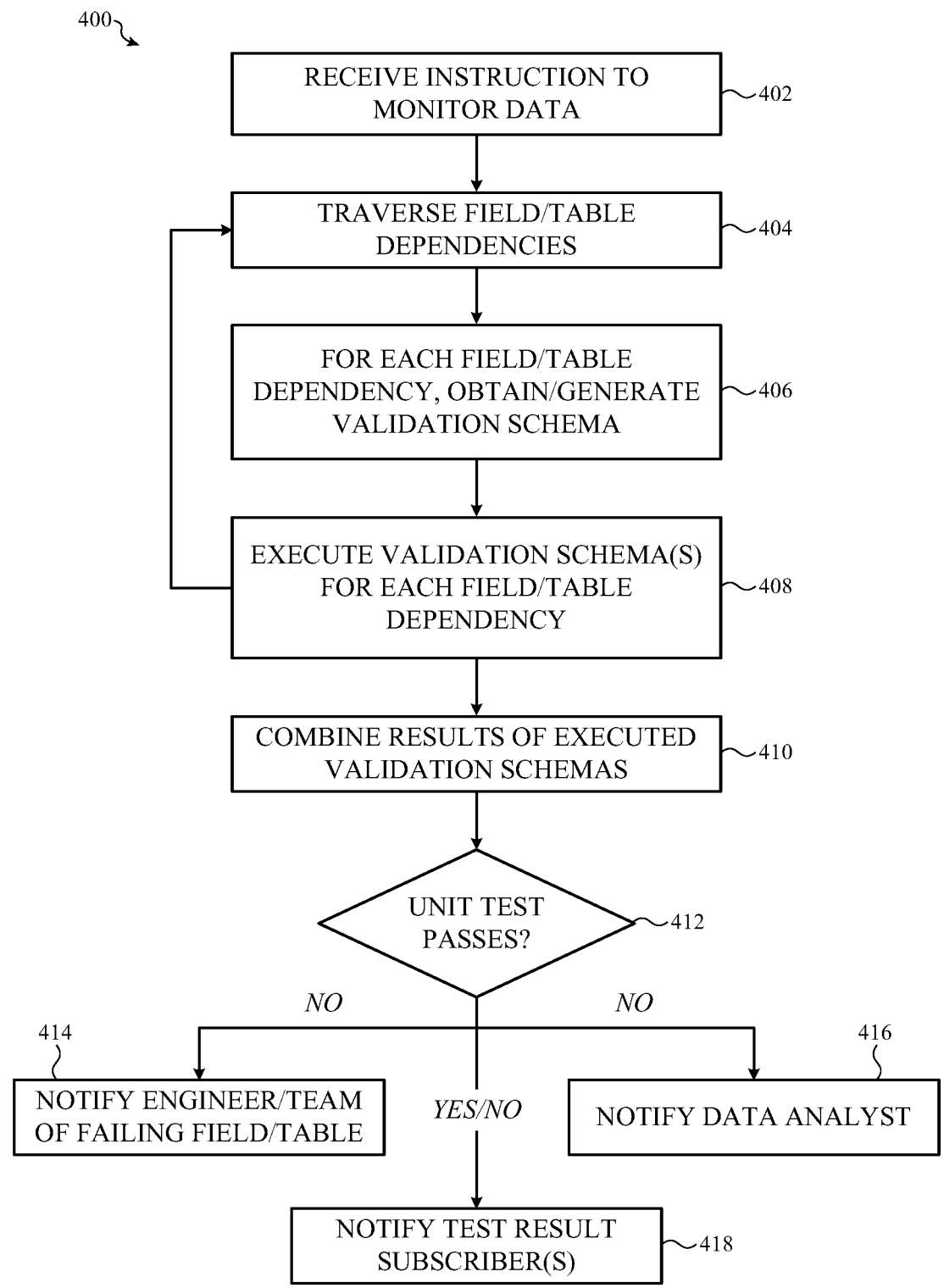
FIG. 4 is a flow chart that depicts example operations of a method of operating a collaborative database consistency system, such as described herein.

FIG. 4 is a flow chart that depicts example operations of a method of operating a collaborative database consistency system, such as described herein. The method 400 includes operation 402 at which an instruction to monitor data is received. In some examples, the instruction is received by a host service or server, such as described herein, but this may not be required.

The method 400 further includes operation 404 at which field and/or table dependencies associated with the data to monitor received at operation 402 are traversed. Next, at operation 406, for each of the determined fields or tables, a validation schema is obtained. In some embodiments described herein, a validation schema may be equivalent to a specification.

Next at operation 408, it may be determined whether a particular validation schema or specification succeeds or fails validation for a particular respective table, field, or column. If additional dependencies remain, the method 400 can return to operation 404. Else, the method 400 can advance to operation 410, results of the executed validation schemas/specifications can be combined in a suitable manner (e.g., a bitwise OR operation is one example) to determine whether the data to monitor passes validation; operation 410 evaluates to true or false.

Next, the method 400 advances to decision point 412 at which the output of operation 410 is evaluated. If decision point 412 receives a false value from operation 410, the method advances to (optionally) all of operations 414, 416, and 418. At operation 414, an engineer and/or team owning the table identified at operation 402 is notified of the failed test. At operation 416, a data analyst charged with maintaining data integrity is notified of the failed test. At operation 418, any and all other test subscribers, which can include the original requesting user (i.e., the user providing input at operation 402) can be notified of the failed test. Alternatively, if decision point 412 receives a true value from operation 410, the method 400 advances only to operation 418 at which all test subscribers, which may include the original requesting user, may be notified of the successful test execution.

Figure 5:
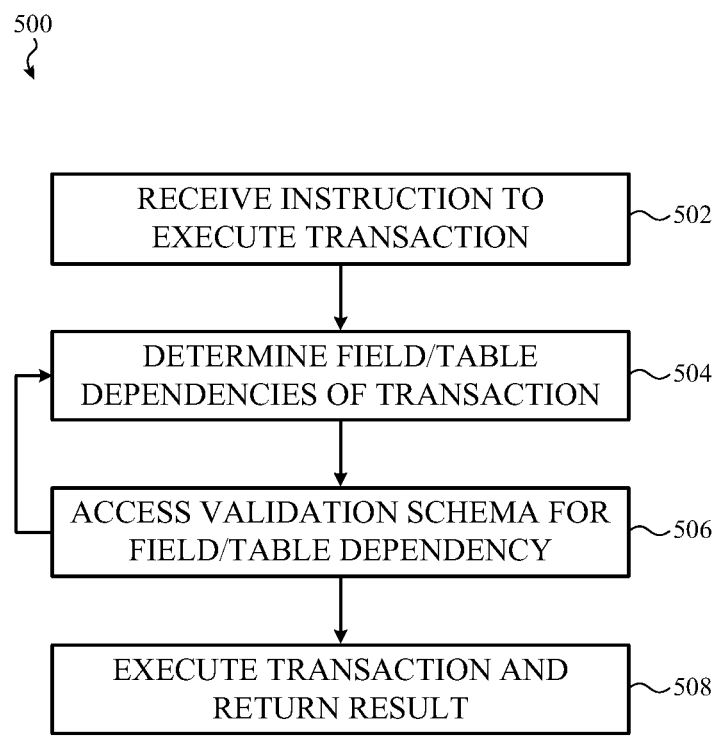
FIG. 5 is a flow chart that depicts example operations of another method of operating a collaborative database consistency system, such as described herein.

FIG. 5 is a flow chart that depicts example operations of another method of operating a collaborative database consistency system, such as described herein. The method 500 serves to validate data prior to execution of a particular query or a particular transaction is processed.

The method 500 includes operation 502 at which an instruction to execute a particular transaction is received. Next, at operation 504, a set of fields and/or tables invoked by the particular transaction can be extracted from the transaction or at least one query of the transaction in order to determine an upstream dependency of the transaction received at operation 502. Next, at operation 506, a validation schema and/or a specification can be obtained and executed for each dependency identified at operation 502; if validation fails, the method 500 can terminate and provide a notification to the user submitting the transaction/query at operation 502 that the data to service that query is not available, not fresh, or is otherwise not verifiable. If additional dependencies exist, the method 500 can return to operation 504. Alternatively, the method 500 can advance to operation 508 at which the transaction is executed and results therefrom are obtained.

Figure 6:
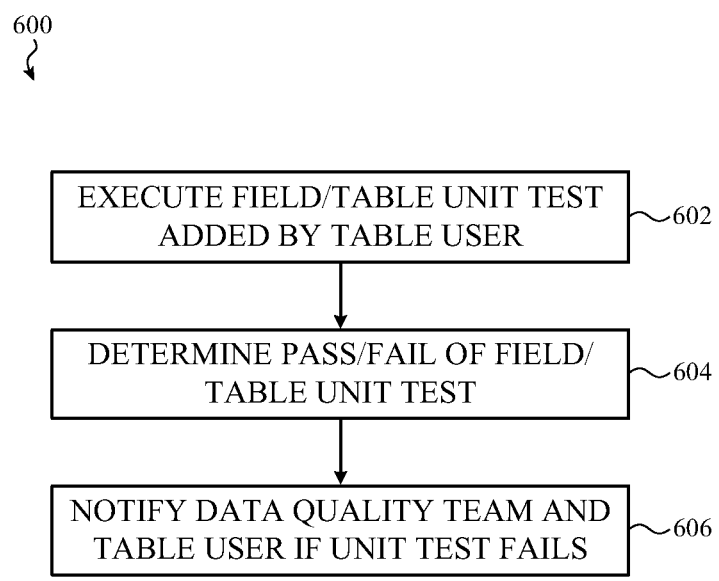
FIG. 6 is a flow chart that depicts example operations of another method of operating a collaborative database consistency system, such as described herein.

FIG. 6 is a flow chart that depicts example operations of another method of operating a collaborative database consistency system, such as described herein. The method 600 includes operation 602 at which a field or table unit test is added to the collaborative database consistency system by a user. The unit test can include one or more SQL queries, transactions, or any other suitable query set or sequence of queries and that is configured to return a Boolean value. Next, at operation 604, the unit tests can be conducted/executed against specified data to determine whether the test passes or fails. Finally, at operation 606, a data quality team and/or the owner of the data under test may be notified if the test fails validation at operation 604.

Figure 7:
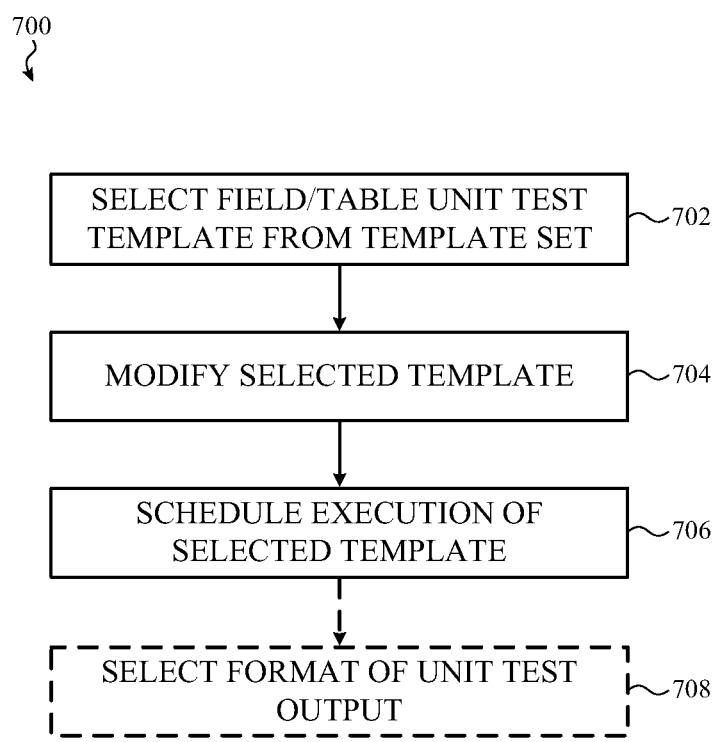
FIG. 7 is a flow chart that depicts example operations of another method of operating a collaborative database consistency system, such as described herein.

FIG. 7 is a flow chart that depicts example operations of another method of operating a collaborative database consistency system, such as described herein. The method 700 includes operation 702 at which a test type is selected by a user. In another phrasing, the user may select a unit test from a set of unit test templates. At operation 704, the method 700 advances to modify the selected template in a particular manner based on another input provided by the same user (e.g., an indication of the data to monitor). Next, the method 700 advances to operation 706 at which the selected, modified, template test may be scheduled for execution against specified data. Finally, optionally, at operation 708, a format of output from the unit test executed at operation 706 can be selected (e.g., whether to show pass/fail, whether to show sequential fails/passes, whether to show a failing upstream dependency, and so on).

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for visually indicating a dataset validation failure to a user of a database service, the method comprising:

generating, at a client device in communication with a database of the database service and operated by the user, a graphical user interface comprising an element identifying, by name, a plurality of datasets;

receiving, at the graphical user interface, a named dataset selected from the plurality of datasets by the user through a selection element soliciting input from the user on the graphical user interface;

querying, by the client device, a unit test service for a plurality of unit test results, each unit test result comprising:

a value indicating whether a previously-executed test transaction executed successfully or failed, the previously-executed test transaction generated by the unit test service by traversing a dependency tree identifying one or more respective upstream tables or respective upstream values from which the previously-executed transaction depends; and a timestamp at which the previously-executed test transaction was executed; and displaying, in the graphical user interface a visual indication corresponding to at least a portion of at least one failed unit test result selected from the plurality of unit test results, the at least one failed unit test result comprising a respective value indicating that the respective previously-executed test transaction failed.

2. The method of claim 1, wherein:

the visual indication is a first visual indication; and the method comprises:

displaying, in the graphical user interface a second visual indication corresponding to at least a portion of at least one successful unit test result selected from the plurality of unit test results, the at least one successful unit test result comprising a respective value indicating that the respective previously-executed test transaction successfully executed.

3. The method of claim 1, wherein the unit test service is configured to interface with an upstream dependency traverser service to generate the dependency tree identifying each respective upstream table and each respective upstream value upon which the named dataset depends at least in part.

4. The method of claim 1, wherein the visual indication is based, at least in part, on a respective timestamp of the least one failed unit test result.

5. The method of claim 2, wherein the first visual indication is displayed adjacent to the second visual indication.

6. The method of claim 2, wherein the first visual indication and the second visual indication are displayed in an array.

7. The method of claim 1, wherein the visual indication identifies a name of a table or a value associated with the at least one failed unit test result.

8. A system for monitoring status of automatic generation and execution of test transactions to monitor data retrieved from a database served by a database service, the system comprising:
- a memory allocation configured to store executable instructions; and
- a processor allocation configured to access the memory allocation and execute at least one of the stored executable instructions to instantiate:
  - a host service providing backend server functionality associated with a client application configured to execute on a client device, the host service configured to receive a selection of a named dataset from the client application, in response to an input provided by a user of the client device to a graphical user interface rendered by the client application;
  - an upstream dependency traverser service configured to define a dependency tree identifying all tables and values of the database upon which the named dataset depends by identifying at least one dependency of at least one field of at least one table of a set of tables, the set of tables determined as referenced by a transaction from the host service that retrieves the selected named dataset from the database; and
  - a unit test service configured to, based on the dependency tree:
    - generate a set of test queries to run against the database;
    - executed each of the set of test queries at a selected interval;
    - store results of execution of each of the set of test queries and a timestamp at which each of the set of test queries were executed as a set of unit test result; and
    - provide to the client application, in response to a request therefor, the set of unit test results.

9. The system of claim 8, wherein the client application is configured to display at least a portion of the dependency tree.

10. The system of claim 8, wherein the host service is configured to provide to the client application, in response to a request therefor, a list of named datasets from which the user selects the named dataset.

11. The system of claim 8, wherein at least one unit test result of the set of unit test results comprises a value indicating whether the at least one unit test results executed successfully or failed.

12. A method for monitoring status of automatic generation and execution of test transactions to monitor freshness of a named dataset generated data retrieved from a database served by a database service, the method comprising:
- displaying, at a client device in communication with the database service, a graphical user interface;
- requesting, by the client device of the database service, a list of named datasets;
- receiving, at the client device from the database service, the list of named datasets;
- rendering, by the client device in the graphical user interface, the list of named datasets;
- receiving, at the graphical user interface, a user input selecting a named dataset from the list of named datasets;
- initiating, in response to selection of the named dataset, determination of a dependency tree identifying all upstream tables upon which the named dataset depends;
- selecting at least one table from the dependency tree and generating a test query thereof, the test query, when executed, configured to output a Boolean value indicating whether the at least one table contains fresh data;
- executing the test query, and storing results thereof as a test transaction result;
- receiving, at the client device, the test transaction result; and
- displaying in the graphical user interface, an indication based on the test transaction result that the named dataset contains fresh data.

13. The method of claim 12, wherein the dependency tree is determined by an upstream dependency traverser service in communication with the database service.

14. The method of claim 12, wherein the test transaction result is stored in the database of the database service.

15. The method of claim 12, wherein the indication comprises a timestamp representing a time at which the test query was executed.

16. The method of claim 12, wherein a color or size of the indication is based, at least in part, on whether the test query executed successfully or failed.

17. The method of claim 12, wherein determining whether the at least one table contains fresh data comprises determining when the at least one table was last updated.

18. The method of claim 12, wherein the test query is executed repeatedly according to a selected schedule.

19. The method of claim 12, wherein executing the test query is performed, at least in part, by a unit test service in communication with the database service.

20. The method of claim 12, wherein the dependency tree identifies all values upon which the named dataset depends.

* * * * *